United States Patent
Des Roches-Dionne et al.

(10) Patent No.: US 12,006,883 B2
(45) Date of Patent: Jun. 11, 2024

(54) METHOD AND SYSTEM OF OPERATING AN AIRPLANE ENGINE

(71) Applicants: Nicolas Des Roches-Dionne, Longueuil (CA); Thomas Trevor Ricci, Kirkland (CA); Charles Bolon-Bruhn, Longueuil (CA); Jeremie Hebert, Napierville (CA)

(72) Inventors: Nicolas Des Roches-Dionne, Longueuil (CA); Thomas Trevor Ricci, Kirkland (CA); Charles Bolon-Bruhn, Longueuil (CA); Jeremie Hebert, Napierville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/592,546

(22) Filed: Feb. 4, 2022

(65) Prior Publication Data
US 2023/0250766 A1    Aug. 10, 2023

(51) Int. Cl.
*F02C 9/58* (2006.01)

(52) U.S. Cl.
CPC .......... *F02C 9/58* (2013.01); *F05D 2220/323* (2013.01); *F05D 2260/74* (2013.01); *F05D 2270/051* (2013.01); *F05D 2270/304* (2013.01); *F05D 2270/335* (2013.01)

(58) Field of Classification Search
CPC .......... F02C 9/58; B64C 11/30; B64C 11/385; B64C 11/40; F01D 7/00; F01D 7/02
See application file for complete search history.

(56) References Cited

U.S. PATENT DOCUMENTS

| | | | |
|---|---|---|---|
| 8,109,728 B2 | 2/2012 | Neitzke et al. | |
| 9,043,050 B2* | 5/2015 | Goodman | F02K 1/76 701/16 |
| 9,366,147 B2* | 6/2016 | Gallet | B64C 11/346 |
| 10,823,113 B2 | 11/2020 | Lamarre et al. | |
| 10,850,831 B2 | 12/2020 | Futa, Jr. et al. | |
| 10,981,662 B2 | 4/2021 | Ettorre et al. | |
| 11,162,382 B2 | 11/2021 | Comandore et al. | |
| 2017/0267329 A1* | 9/2017 | Lassalle | F01D 7/00 |
| 2018/0066671 A1* | 3/2018 | Murugan | F04D 29/323 |
| 2019/0031319 A1* | 1/2019 | Calkins | B64C 11/40 |
| 2019/0055901 A1* | 2/2019 | Lamarre | F02K 1/76 |
| 2019/0092453 A1* | 3/2019 | Hoemke | B64C 11/40 |

(Continued)

FOREIGN PATENT DOCUMENTS

| | | |
|---|---|---|
| EP | 2626537 B1 | 6/2016 |
| EP | 3543112 B1 | 10/2020 |

OTHER PUBLICATIONS

DASH8-200/300-PowerPlant.

*Primary Examiner* — Topaz L. Elliott
*Assistant Examiner* — Ryan C Clark
(74) *Attorney, Agent, or Firm* — Norton Rose Fulbright Canada LLP (57) ABSTRACT

The method can include, while the airplane is on the ground: entering a disking mode including positioning the blades at a disking pitch including rotating each blade around the length, the disking pitch oriented parallel to the plane of rotation; maintaining the blades at the disking pitch; and exiting the disking mode when a disking mode exit condition is met, including rotating each blade around the length, away from the disking pitch.

19 Claims, 8 Drawing Sheets

(56) References Cited

U.S. PATENT DOCUMENTS

| | | | |
|---|---|---|---|
| 2020/0010219 A1* | 1/2020 | Felippone | F02C 9/58 |
| 2020/0232395 A1 | 7/2020 | Chahal et al. | |
| 2020/0298959 A1* | 9/2020 | Castellani | F01D 5/021 |
| 2020/0307774 A1* | 10/2020 | Zingaro | B64C 11/305 |
| 2021/0009278 A1* | 1/2021 | Forte | B64D 31/06 |
| 2021/0079855 A1* | 3/2021 | Cervelli | B64C 11/38 |
| 2021/0206474 A1 | 7/2021 | Danielson | |

\* cited by examiner

METHOD AND SYSTEM OF OPERATING AN AIRPLANE ENGINE

TECHNICAL FIELD

The application relates generally to airplane engines and, more particularly, to a control mode therefore.

BACKGROUND OF THE ART

Airplane engines are designed to operate in various conditions, such as taxiing, takeoff, climbing, cruising, descent and landing in particular, with potentially significant variations in atmospheric conditions such as wind and temperature. However, they may also be required to operate in other conditions. For instance, gas turbine engines can be required to operate for certain periods of time while the aircraft is immobile, on the ground. Indeed, the engine operation may be required by one or more systems of the airplane, and/or there can be a period of time between engine startup and taxiing during which the engine needs to continue to operate.

Some airplane engines have thrust devices (e.g. propeller or fan) with variable pitch, a variable angle of their blade around an axis extending along the length of the blade, and can have a mechanism for changing the pitch. This can be the case in some turboprop engines, for instance, in which the pitch (sometimes referred to as Beta angle) of propeller blades can be changed between a coarse pitch and a fine pitch, for instance, as a function of conditions such as airspeed, required thrust, etc., and in some turbofan engines in which the pitch of fan blades can be changed for similar reasons.

It was known to provide some turboprop engines with a "feathering" mode of operation which was specifically designed to alleviate inconveniences to persons or equipment which may need to approach the grounded aircraft while the engine is operating. Indeed, a typical idle operation mode can be considered equivalent to a "ready for takeoff" mode in the sense that the pitch can be adjusted in preparation for takeoff, while limiting the power, which nonetheless produces thrust. In the feathering mode, the pitch of the variable blades can be adjusted to be extremely coarse, e.g. perpendicular to the plane of rotation/parallel to the rotation axis, with the effect of minimizing thrust.

However, while feathering mode was satisfactory to a certain degree, there always remains room for improvement.

SUMMARY

In one aspect, there is provided a method of operating an engine of an airplane, the engine having an engine controller and a rotary thrust device having a plurality of variable pitch blades, each blade having a length extending radially away from a rotation axis, each blade individually rotatable around the length, the blades distributed circumferentially around the rotation axis and collectively rotatable around the rotation axis, in a plane of rotation, the method comprising: while the airplane is on the ground: at the engine controller, entering a disking mode including positioning the blades at a disking pitch including rotating each blade around the length, the disking pitch oriented parallel to the plane of rotation; at the engine controller, maintaining the blades at the disking pitch; and at the engine controller, exiting the disking mode when a disking mode exit condition is met, including rotating each blade around the length, away from the disking pitch.

In another aspect, there is provided a system for operating an engine of an airplane, the engine having a rotary thrust device having a plurality of variable pitch blades, each blade having a length extending radially away from a rotation axis, each blade individually rotatable around the length, the blades distributed circumferentially around the rotation axis and collectively rotatable around the rotation axis, in a plane of rotation, the system comprising a non-transitory memory having stored thereon computer-readable instructions which, when executed thereon by a processor, perform a method including: entering a disking mode including positioning the blades at a disking pitch including rotating each blade around the length, the disking pitch oriented parallel to the plane of rotation; maintaining the blades at the disking pitch; and exiting the disking mode when a disking mode exit condition is met, including rotating each blade around the length, away from the disking pitch.

In a further aspect, there is provided a computer software product stored in a non-transitory memory and operable to, when executed upon by a processor, perform a method of operating an engine of an airplane, the engine having a rotary thrust device having a plurality of variable pitch blades, each blade having a length extending radially away from a rotation axis, each blade individually rotatable around the length, the blades distributed circumferentially around the rotation axis and collectively rotatable around the rotation axis, in a plane of rotation, the method including: entering a disking mode including positioning the blades at a disking pitch including rotating each blade around the length, the disking pitch oriented parallel to the plane of rotation; maintaining the blades at the disking pitch; and exiting the disking mode when a disking mode exit condition is met, including rotating each blade around the length, away from the disking pitch.

DESCRIPTION OF THE DRAWINGS

Reference is now made to the accompanying figures in which.

DETAILED DESCRIPTION

Figure 1:
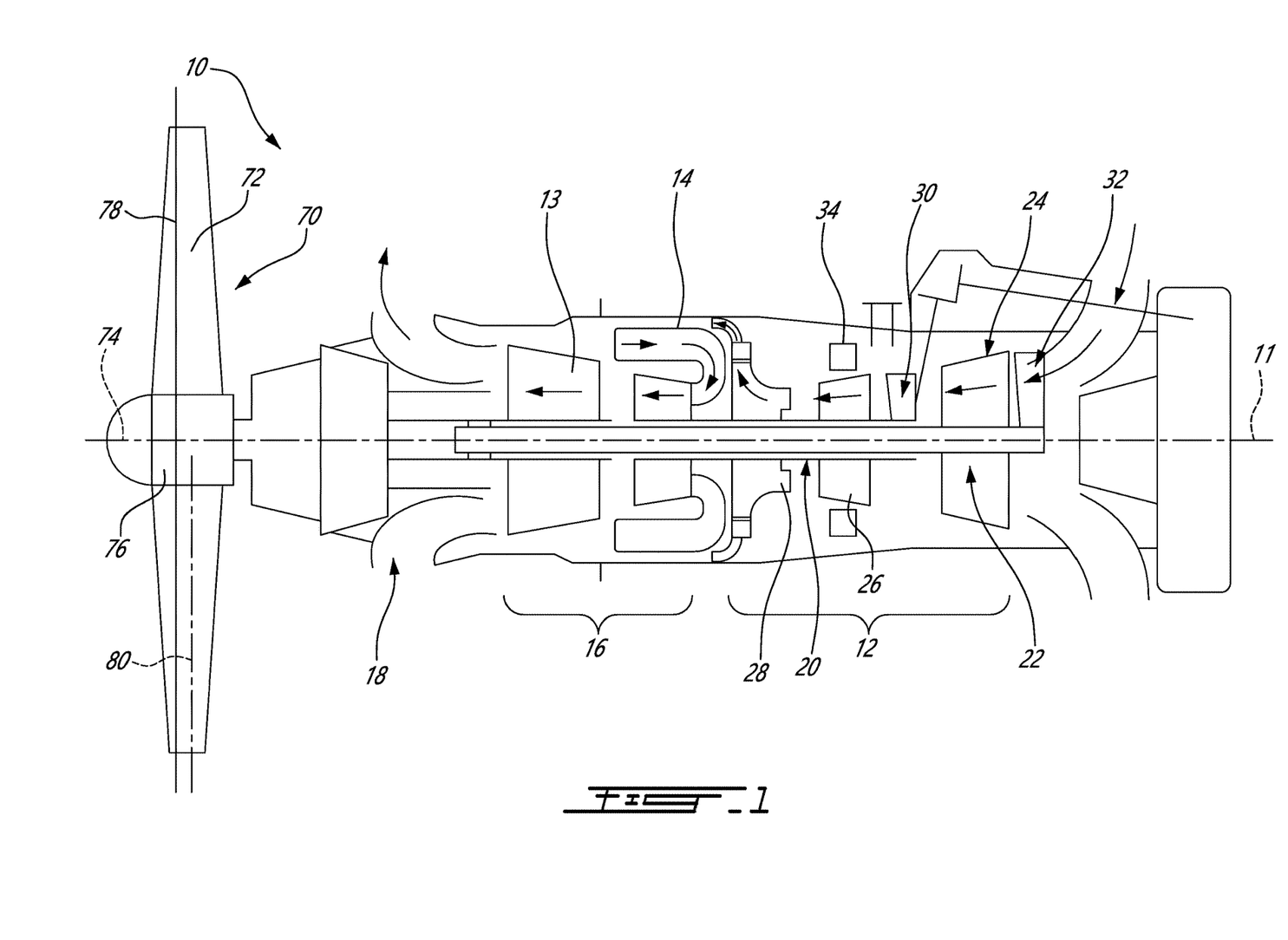
FIG. 1 is a schematic cross-sectional view of a gas turbine engine.

FIG. 1 illustrates an example of a turbine engine. In this example, the turbine engine 10 is a turboprop engine generally comprising in serial flow communication, a multistage compressor 12 for pressurizing the air, a combustor 14 in which the compressed air is mixed with fuel and ignited for generating an annular stream of hot combustion gases around the engine axis 11, and a turbine section 16 for extracting energy from the combustion gases. The turbine engine terminates in an exhaust section.

The fluid path extending sequentially across the compressor 12, the combustor 14 and the turbine 16 can be referred to as the core gas path 18. In practice, the combustor 14 can include a plurality of identical, circumferentially interspaced, combustor units. In the embodiment shown in FIG. 1, the turboshaft engine 10 has two compressor and turbine stages, including a high pressure stage associated to a high pressure shaft 20, and a low pressure stage associated to a low pressure shaft 22. The low pressure shaft 22 is used as a power source during use.

In some cases, turboprop engines have reduction gearing via which the power of the low pressure shaft 22 is transferred to an external shaft 96 bearing the propeller, whereas in other cases, the low pressure shaft 22 directly bears the propeller. In the case of turbofan engines, the low pressure shaft 22 typically directly bears the fan, however some engines have more than two pressure stages. Many engines do not have a clutch between the propeller and the low pressure shaft, and the propeller is thus integrally and continuously driven by the rotation of the low pressure shaft.

Figure 2A:
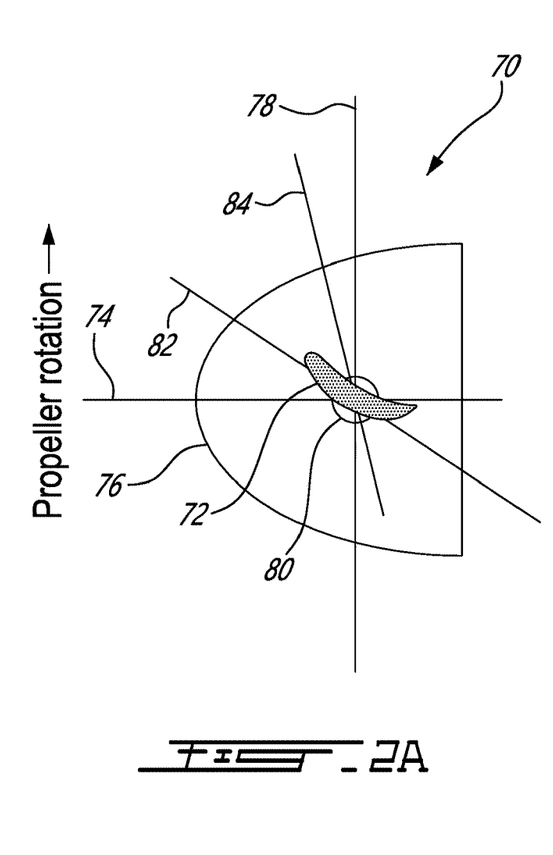
FIGS. 2A, 2B and 2C side elevation views schematizing various blade pitches.

Many turboprop engines, and some turbofan engines, have variable pitch systems. Referring to FIG. 2A, the principle of a variable pitch system will be explained here in relation with a turboprop engine example, with the understanding that this explanation can be transposed to fan blades of turbofan engines. Turboprop engines have a rotary thrust device in the form of a propeller 70 which include a plurality of blades 72 whereas in turbofans, the thrust device in is the form of a fan having a plurality of blades (not shown). The blades 72 each have a length extending radially away from a propeller rotation axis 74 (which can coincide or be offset from the main axis 11 depending on the embodiment), and the blades 72 are circumferentially distributed (interspaced from one another) around a hub 76 centered on the rotation axis 74. The blades 72 are collectively rotatable when the propeller 70 rotates, in a plane of rotation 78. Each blade extends roughly radially from the hub 76 from a stem to a tip. In addition to being collectively rotatable around the rotation axis 74, each blade 72 is individually rotatable around a pitch axis 60 extending along its length so as to allow controlling its pitch. Typically, the pitch of all blades 72 of a given propeller 70 is changed simultaneously.

During flight, airspeed can vary and the rotation speed of the propeller 70 can also vary, leading to changes in the incidence angle locally perceived by each blade taking into consideration its tangential velocity. Changing the pitch can change this incidence angle, which can produce more or less thrust, and lead to a change in air speed, and thus incidence angle. Changing the rotation speed can also be affected by the amount or power (e.g. fuel flow rate into the engine in the case of a pure heat engine) for example. The incidence angle and the rotation speed, in turn, affect the airspeed, forming a relatively complex relationship between many measurable variable parameters. Some variable pitch systems are manually controlled, whereas others are controlled by a computer (e.g. engine controller) or mechanically controlled. In some embodiments where variable pitch systems are controlled by an engine controller, the software functions associated to blade control can be grouped and said to form part of a blade control module, sometimes referred to as a propeller control unit. Such a blade control module can have a function to control the pitch of the blades, and can also have a function to control a rotation speed of the blades (around the rotation axis) in some embodiments.

As graphically represented in FIG. 2A, pitch angles in which the chord of the blades are closer to alignment with the rotation axis are referred to as "coarser" 82 by convention, whereas pitch angles in which the chord of the blades are closer to alignment with the plane of rotation of the blades are referred to as "finer" 84.

In practice, in many embodiments, blades 72 are designed with a twist along their length to account for the fact that the tangential velocity at the tip of the blades 72 is greater than the tangential velocity at the root, at a given angular speed, due to the difference in circumference. The different tangential velocities can lead to differences in locally perceived angles of attack which the twist can aim to minimize. In such cases, the angle of the chord relative to the pitch axis is not constant along the length of the blade 72 and the expression "pitch angle" can therefore refer to an average chord angle taking into consideration the entire length of the blade 72.

Figure 2B:
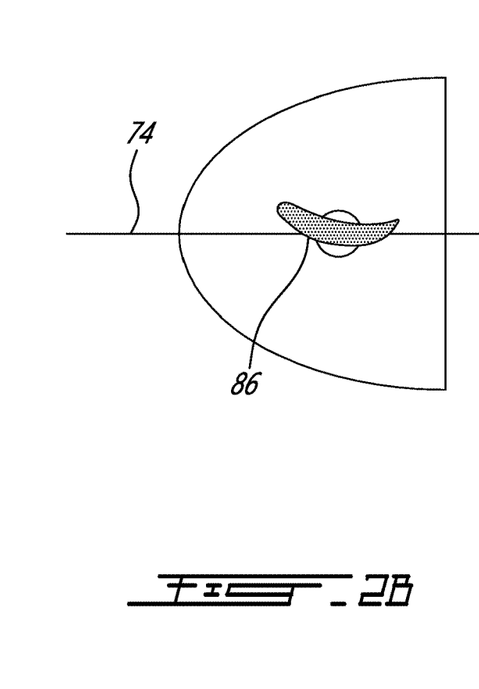

In some variable pitch systems, the blades 72 can be positioned at a "feathering" pitch 86, illustrated in FIG. 2B, which may be perceived as ultimate coarseness. At feather pitch 86 the average blade chord angle can be perpendicular to the rotation plane/aligned with the rotation axis. In flight, the feathering angle can be used, for instance, to limit drag which would otherwise be caused by the presence of a propeller on an engine which is not currently in operation for instance. On the ground, the feather pitch 86 can be used to limit thrust, which may be convenient in some embodiments where thrust is not desired but engine operation is nonetheless required. Operating the thrust device at feather pitch 86 in this context can be referred to as operating the thrust device in feathering mode. Feathering mode can be used to allow persons or equipment to approach the airplane after engine startup for instance, while minimizing inconveniences such as blowout which may otherwise be felt by such persons or equipment due to the operation of the engine and rotation of the blades 72. This can allow more comfort when unplugging the ground cart, embarking passengers or merchandise, etc., while the engine is running. In a typical turboprop engine, the feather pitch 86 can be achieved by draining oil from the propeller control mechanism.

Feathering mode can also involve reducing engine power in such conditions, e.g. to save fuel or limit or exhaust jet-related inconveniences, but there can be practical limits to how low the power can be brought. Such limits can be imposed by the engine itself, such as in terms of how low the power can go while allowing the engine to continue running for instance, or how low the power can go while one or more engine subsystem, such as the secondary air system for instance, can continue to operate satisfactorily. Secondary air systems, for instance, can require a certain compressor pressure and/or engine power to operate satisfactorily.

Changing the pitch angle to feathering 86 while maintaining a same engine power can lead to a reduction in propeller speed, given the fact that when the propeller rotates at the feather pitch angle 86 at zero airspeed, the average orientation of the blade operates flat against the local fluid flow, generating maximum drag (turbulence) and minimum thrust, and thus a maximum resistance force exerted by the air against the blades. This drag also entails significant turbulence, which may not be suitable in some embodiments where it may be considered uncomfortable to persons or equipment approaching the airplane for instance. The lower rotation speed may also be unsatisfactory for other reasons, such as the presence of a dynamic vibrational resonance mode at such lower RPM, sometimes referred to as a no dwell zone.

Accordingly, while an idle mode having an associated, typically fine pitch, and typically low engine power, may be suitable to a given engine, the lower rotation speed caused by switching to feather pitch 86 may not be suitable for one or more reasons. Accordingly, for such or other reasons, while a feathering mode can be suitable in some embodiments, it may be unsuitable to others.

It was found that in some embodiments, a disking mode could be suitable while a feathering mode is not, or a disking mode can otherwise form a suitable alternative to a feathering mode.

Figure 2C:
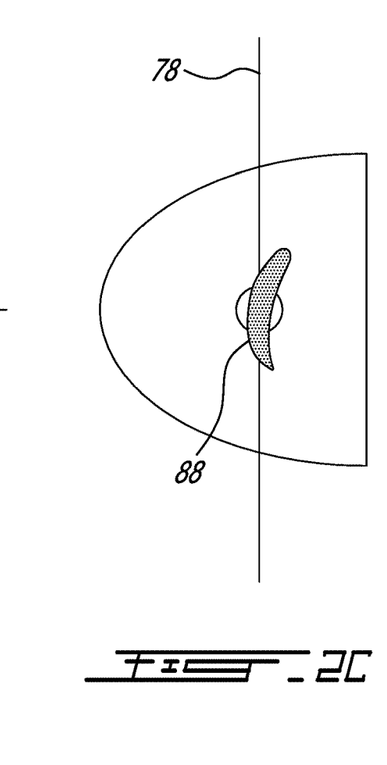

Referring to FIG. 2C, a disking pitch 88 can be said to correspond to a situation where the average chord angle of the blade along its length is positioned in a manner to be in alignment with (e.g. parallel) to the plane of rotation 78 of the blades 72 around the rotation axis 74 (i.e. a pitch which is fine to the extreme but not significantly reverse). In this configuration, the rotation of the blades 72 also produces minimal thrust, e.g. no net thrust, but also produces significantly less drag and turbulence than the feather pitch 86. The lower turbulence generated by operating the thrust device for sustained periods of time in the disking mode can be considered more comfortable to approaching persons or equipment, and in any event, can also, in some cases conveniently, produce a different effect on thrust device rotation speed, than a feathering mode. Indeed, in disking mode, both the drag and thrust can be minimized. In some cases, for a same engine power, positioning the pitch from an idle pitch (e.g. 84) to a disking pitch 78 can lead to a reduction in propeller blade drag and a slight increase in propeller rotation speed instead of a significant decrease in propeller speed which would occur in feathering. Indeed, it was found that operating in disking mode could, in some embodiments, conveniently allow operating the engine at a lower power than if the engine was operating in feathering mode instead.

Figure 3:
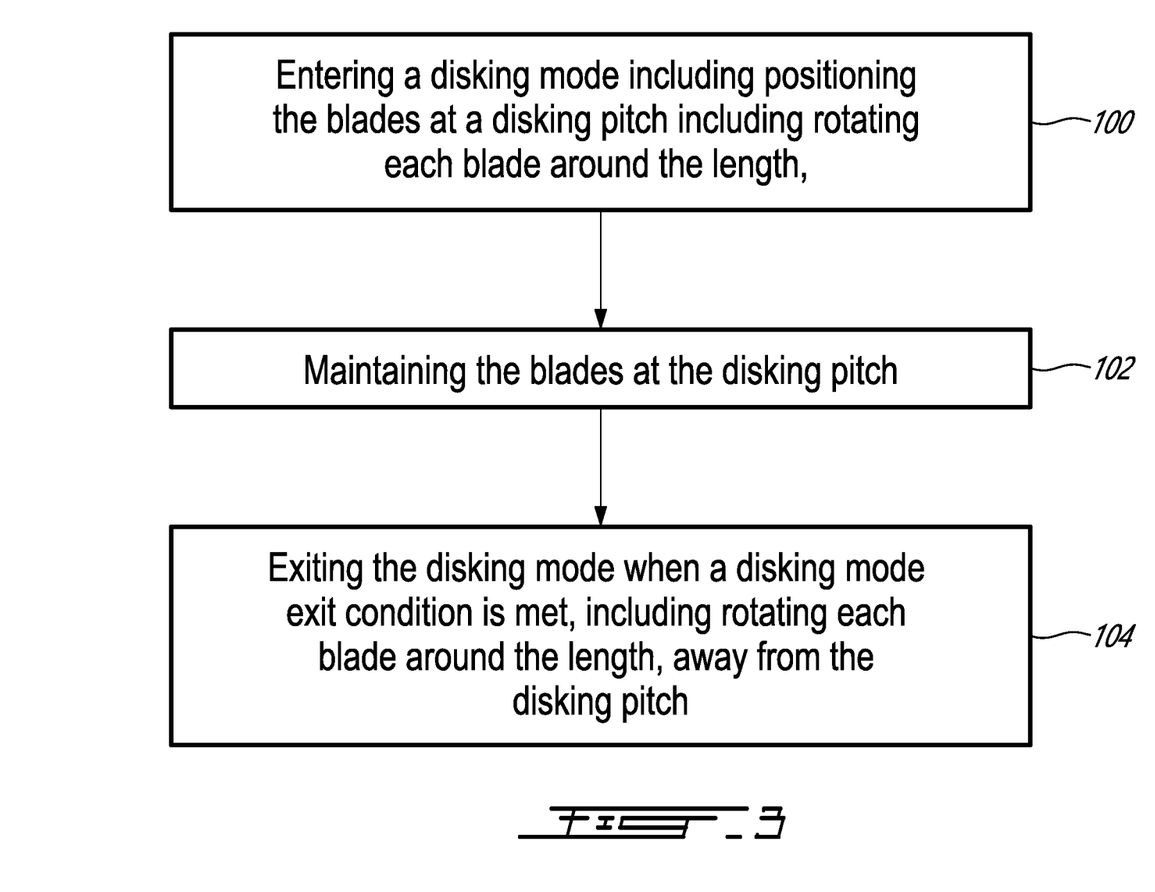
FIG. 3 is a flow chart showing an example method of operating an engine.

An example method of implementation of the disking mode is presented in FIG. 3. In this example, when the airplane is on the ground and immobile, the engine controller can enter 100 a disking mode which can include positioning the blades at a disking pitch, typically involving rotating the blades individually around the pitch axis from a fine (or coarser) pitch to the disking pitch, maintaining 102 the blades at the disking pitch for a given period of time thereafter, and once the disking mode is no longer required, e.g. when a disking mode exit condition is met, exiting 104 the disking mode which can include rotating the blades individually around the pitch axis away from the disking pitch, e.g. from the disking pitch to a fine or coarser pitch.

The method presented in FIG. 3 can involve switching into the disking mode from an idle mode, and switching out from the disking mode back into the idle mode, for example. The idle mode can be a "ready for takeoff" mode where the blades are maintained higher than disking (e.g. fine) and the engine power is adapted for relatively prompt increase upon receiving an eventual associated command.

In one embodiment, the disking mode can be designed in a manner to be commanded specifically by a pilot of the airplane, which can involve providing a suitable pilot interface 90 in the cockpit (see FIG. 4) with which a pilot can make a requesting action. The pilot interface 90 can take the form of a mechanical or graphical switch or button, for instance, which the pilot can toggle or trigger to signify a disking mode entry request. In one embodiment, the switch or button can be toggled back or triggered again to signify a disking mode exit request for instance, which can be considered a disking mode exit condition, or another disking mode exit condition can be used, such as a request from the pilot to enter idle mode, or any other suitable design choice. The disking mode entry or exit request can be received as an input by the engine controller 92, and entering or exiting the disking mode, respectively, can be based on receiving the associated input.

In one embodiment, the disking mode can be sustained for a given period of time, such as more than one minute, more than two minutes, more than 5 minutes or even more, as found suitable in the given context. The disking mode can typically be sustained for at least enough time to allow a ground crew or equipment to approach, perform a task, and move back away from the airplane having the running engine for instance.

Figure 4:
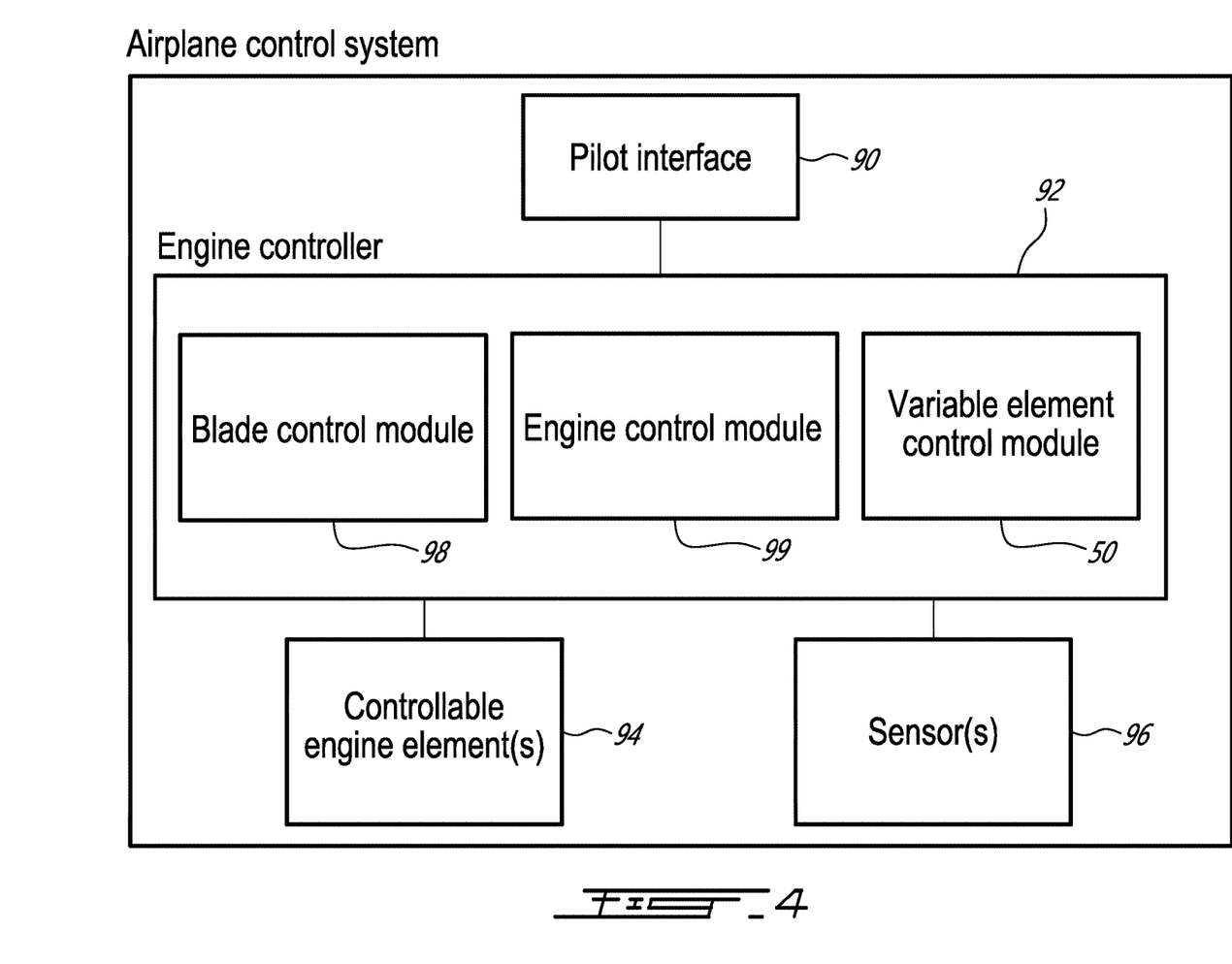
FIG. 4 is a block diagram of an airplane control system.

FIG. 4 presents an example of an airplane control system which generally includes an engine controller 92, a pilot interface 90 configured for allowing the pilot(s) to interact with the engine controller 92, controllable engine elements 94 (e.g. engine power, high pressure stage rotation speed, propeller rotation speed, blade pitch, variable geometry element(s)), and sensors 96 which provide measured values of various variable parameters which can affect the control of the controllable engine elements 94.

An example engine controller 92 can be embodied as a centralized unit or distributed in the form of a plurality of physical units. A plurality of physical units can be configured to communicate with one another and to share physical resources such as memory or computing power for instance. Various modifications are possible.

An example airplane control system can have a plurality of functions associated to engine control and which can be said to be performed by "an engine controller". From a programming and design point of view, it can be convenient to refer to such different functions, or group a plurality of such different functions, as "modules" or "units", somewhat independently of the physical, hardware implementation. Accordingly, in this specification, a blade control module 98 can be defined as including a function of controlling blade pitch for instance. In some embodiments, such a blade control module 98 can further be responsible for controlling a propeller or fan rotation speed for instance. Such a blade control module 98 can be configured for executing automated control functions based on inputs such as pilot commands and sensor input (current values of monitored parameters).

In one example, when in disking mode, the blade control module 98 of the engine controller 92 can perform the automated function of maintaining the blades at the disking pitch for the duration of the disking mode. Indeed, in some embodiments, and taking into consideration the mechanical hardware and aerodynamic effects involved, maintaining the blades 52 at the disking pitch can be a task which is difficult to perform manually by a pilot, and this difficulty can be somewhat proportional to the duration. Indeed, at an ideal disking pitch, the overall thrust can be zero, but in practice, dwelling at the ideal disking pitch may not be feasible as vibrations and the like may lead to slightly shifting the pitch towards reverse or towards forward. When this happens, aerodynamic effects can tend to dig the pitch further towards reverse or towards forward, respectively, and any play in a manual pitch angle control mechanism can lead a pilot attempting to bring the pitch back to ideal disking to overshoot and rather bring the pitch from forward to reverse, or vice versa, and the same can occur again when the pilot attempts to bring the pitch back from the latter position. Such inconveniences can be overcome, in some embodiments, by delegating the task of dwelling in the disking mode to the engine controller, which can use a stabilizing algorithm, such as a proportional integral (PI) control algorithm or proportional integral derivative (PID) control algorithm, for instance, to deal with the inherent instability of the disking mode. In some embodiments, it can be suitable for the controller to operate at a lower gain, for instance, when operating in the disking mode. In fact, experiments and simulations have demonstrated that this was possible in some embodiments, which can be counter-intuitive considering the perceived instability of the disking pitch.

In one example, when in disking mode, the engine controller 92 can further monitor and control the thrust device and/or high pressure spool rotation speed. Indeed, the engine controller 92 can have, stored in a local memory, a definition associated to a no dwell zone of RPM, such as a minimum RPM, a maximum RPM, and/or a range of RPM for one of or both the thrust device and one or more other rotary elements of the engine, and operate automated control of the engine to avoid staying in such no dwell zone for significant/prolonged periods of time. Accordingly, for instance, the engine controller 92 can, while operating in disking mode, monitor the rotation speed of the thrust device, compare it to the definition of the no dwell zone, and effectuate a control of one or more controllable engine parameters, such as engine power (e.g. via fuel flow rate) or blade pitch for instance, to move the rotation speed out of the no dwell zone, or prevent it from entering the no dwell zone. Similarly, the engine controller 92 can, while operating in disking mode, monitor the rotation speed of one or more spools of the engine, compare it to the definition of the no dwell zone, and effectuate a control of one or more controllable engine parameters, such as engine power or blade pitch for instance, to move the rotation speed out of the no dwell zone, or prevent it from entering the no dwell zone.

In one example, when in disking mode, the engine controller 92 can further monitor and control another controllable parameter, such as engine power, or the configuration of one or more variable geometry elements for instance, based on current values of monitored parameters. Moreover, in some embodiments, the control scheme of such controllable parameters can change when switching to and from the disking mode from another mode, such as changing a targeted value or changing a schedule for instance.

For instance, referring back to FIG. 1, in this embodiment, each axial compressor stage has a rotor followed by a stator (not shown) as known in the art. Moreover, in this embodiment, each axial compressor stage further has a corresponding set of variable guide vanes 30, 32 upstream of the rotor. The variable guide vanes, like stator vanes, includes a set of airfoil shaped vanes which have a length extending across a corresponding portion of the annular gas path. In a compressor stage which is perfectly axially oriented (relative the engine axis 11), the length of the variable guide vanes can extend radially, but in practice, the actual orientation can depend on the orientation of the gas path. If the gas path extends or slopes obliquely, the vanes can extend obliquely as well for instance, as in many cases, the optimal orientation of the vanes will be at least roughly transversal to the orientation of the gas path. The vanes of a set of variable guide vanes are circumferentially interspaced from one another around the engine axis 11. However, unlike the stator vanes, the variable guide vanes 30, 32 are configured in a manner to have a variable angle of attack, and to this end are configured to rotate individually and collectively around their individual axes, in a manner to control the swirl angle of the air entering the corresponding rotor. Indeed, compressor functionality can be significantly sensitive to the swirl angle at which the rotor blades receive the incoming air. In alternate embodiments, only one compressor stage may have variable guide vanes, or variable guide vanes may be entirely omitted.

In this embodiment, one axial compressor stage 26 has a bleed valve 34. The bleed valve 34 can be mounted to the outer wall of the gas path, and can be opened at varying degrees of opening between 0% (fully closed) and 100% (fully open), to allow a corresponding flow rate of air to escape the compressor stage in a manner to control pressure therein as a function of varying operating conditions. In alternate embodiments, the bleed valve can be switchable strictly between fully closed and fully open, as opposed to partially openable, though such a scenario may be less common. In alternate embodiments, more than one compressor stage may have a bleed valve, and in still other embodiments, bleed valves may be omitted from the entire engine.

Variable guide vanes 32, 30 and bleed valves 34 are two examples of variable geometry elements which can be introduced in one or more compressor stages 24, 26, 28 with an aim of changing the configuration of the compressor stage to adapt to changing operating conditions in a manner to promote greater efficiency while respecting any required safety margin from points of operation representing potentially undesired aerodynamic behaviors. Other embodiments may have other variable geometry elements than variable guide vanes and bleed valves, and in embodiments where more than one variable geometry element is used, different combinations of variable geometry element types can be used depending on the intended use of the engine.

Figure 5:
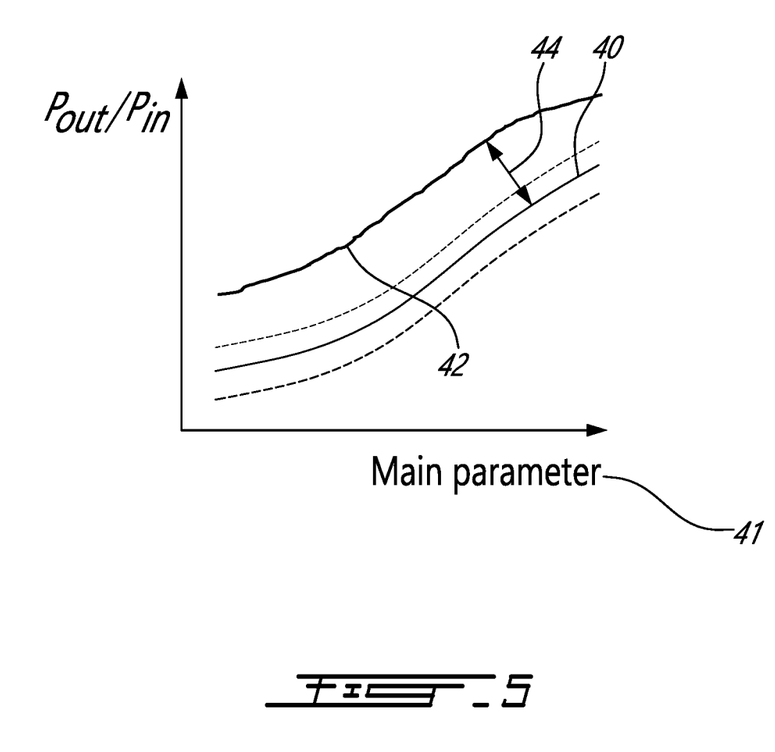
FIG. 5 is a graphical representation of a compressor operating line defined in terms of relationships between variable parameters and aerodynamic behavior references.

In the control of variable geometry elements, the concept of operating line has been introduced and represents a selection of points of operation of a given compressor stage as a function of various parameters representing the varying conditions of operation across the operating envelope. An example operating line 40 represented in terms of a relationship between operating parameters of a gas turbine engine is presented in FIG. 5. The points of operation corresponding to the operating line 40 can represent, in each corresponding condition of operation, the highest achievable compressor efficiency while respecting any required safety margin 44 with a point of potential undesired aerodynamic behavior. The limit beyond which potential undesired aerodynamic behavior can include a surge line 42 also defined in terms of a relationship between operating parameters of the gas turbine engine. The safety margin 44 can correspond to the difference between the operating line 40 and the surge line 42. One or more variable geometry element 46 can be controlled, in real time, such as during flight, in a manner to maintain the operation of the compressor stage as close as possible to the operating line 40.

Figure 6:
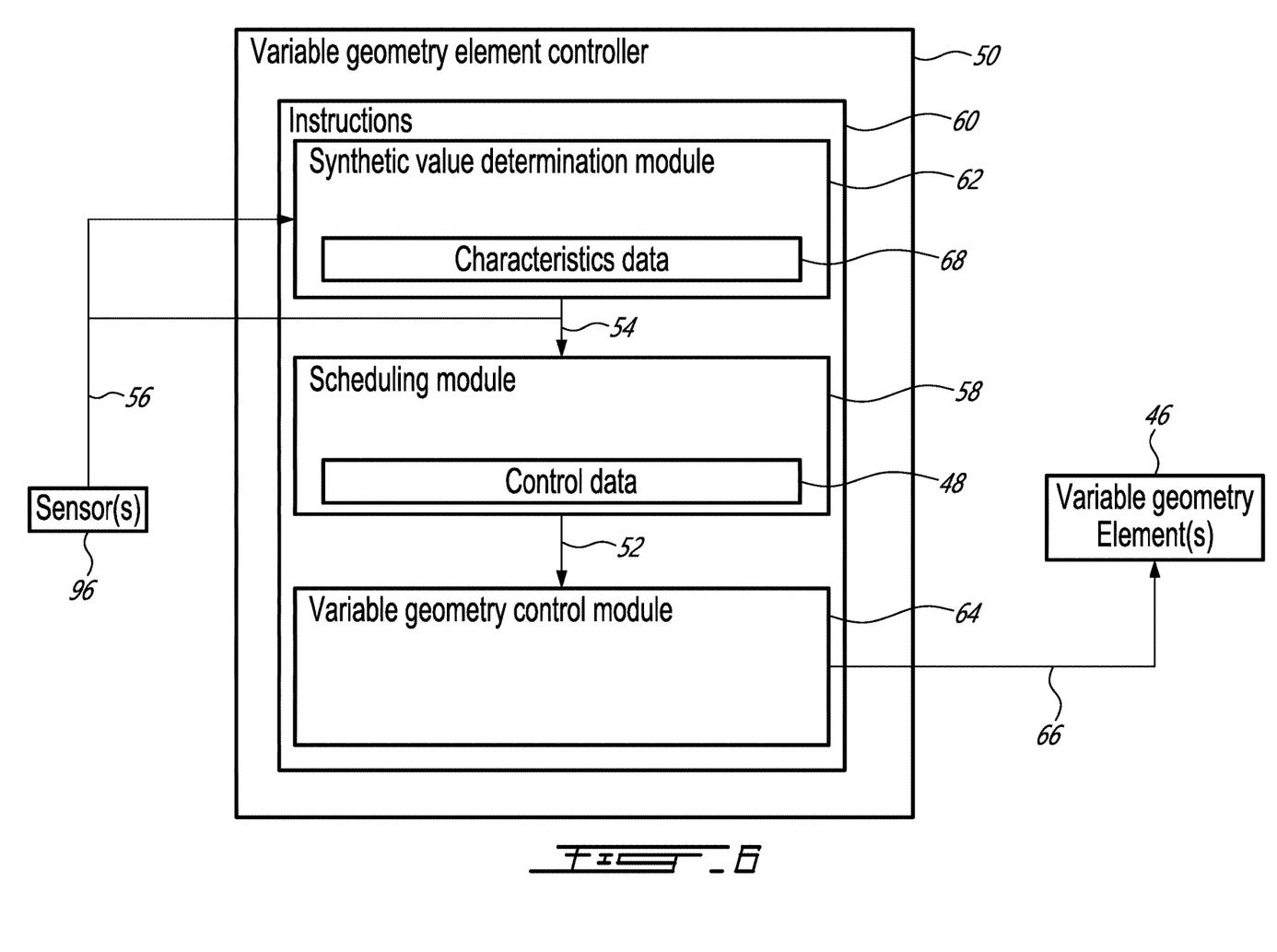
FIG. 6 is a block diagram representing functionalities of a variable geometry element controller in accordance with an embodiment.

Referring now to FIG. 6, it will be noted that in practice, the control of variable geometry elements 46 can be performed using relatively complex sets of computer readable instructions including control data 48, and which can include "schedules", which can be used as a basis for defining relationships between various values of operating parameters. For instance, the control data can be used to match values of control parameters associated to different possible geometries of the variable geometry element(s) with different sets of monitored parameters, the latter being acquired in real time during operation of the engine using sensors, reference data, instructions, and calculation. Accordingly, a controller 50 of the variable geometry element(s) 46, which can be integrated as functionalities of the engine controller or embodied separately therefrom, can continuously determine actualized control parameter values 52 corresponding to continuously changing monitored parameter values 54, and continuously adjust the configuration of the variable geometry elements 46 to match the actualized control parameter values 52.

The variable geometry elements 46 of the engine 10 can be controlled by a variable geometry element controller 50, which can alternately be referred to as a variable element control module 50, an example of which is presented in FIG. 3. In many embodiments, it can be considered practical for the variable geometry element controller 50 to be provided in the form of a corresponding one of several modules/functionalities integrated within a centralized engine controller (a specialized form of computer dedicated to engine control) for instance, whereas in other embodiments, it can be preferred to embody the variable geometry element controller 50 as a standalone computer.

In practice, the limited representation of the current operating conditions can be acquired via one or more sensors 96 and made available to the variable geometry element controller 50. The sensors 96 can produce corresponding signals which can be associated to values of measured parameters, a process which may be based on prior calibration in some or all cases. In some cases the measured parameter values 56 can be used directly as monitored parameter values 54 by a scheduling module 58 of the variable geometry element controller 50, whereas in other they can be used to produce synthetic parameters which, in turn, can be used as monitored parameter values 54 by the scheduling module 58. Either one or both measured parameters 56 and synthetic parameters can form a set of monitored parameters 54 which are used by the scheduling module 58 to acquire information about current operating conditions (current values of monitored parameters). Such sensors 96 can include pressure, temperature and torque sensors for instance.

During operation, in accordance with computer readable instructions 60, the variable geometry element controller 50 can obtain values 56 of one or more measured parameters via sensors 96. As evoked above, such values 56 of measured parameters can be used directly as values of monitored parameters 54, or indirectly, as an element used in determining a value of a synthetic parameter, the latter of which can then be used as a monitored parameter 54. The group of functions associated with determining values of synthetic parameters will be referred to herein as a synthetic value determination module 62 for the sake of simplicity and ease of reference, which can form part of the functions constituting the variable geometry element controller 50. The sensors 96 can include more than one type of sensor (e.g. pressure, temperature, torque), and can be associated to different points along the main gas path and/or to different components of the gas turbine engine (e.g. a torque sensor can be integrated to an engine shaft).

The process or processes of associating values of monitored parameters 54, whether directly measured or synthetic, with values of control parameters 52 of the variable geometry element(s) 46, whether absolute or relative, can be considered to form part of a scheduling module 58 of the variable geometry element controller 50 for ease of later reference, and to be based on control data 48 and on monitored parameter values 54, which can be accessible to the scheduling module 58. The scheduling module 58 can produce control parameter values 52 as an output based on the computer readable instructions 60. The process or processes of controlling the geometrical configuration of the variable geometry element(s) 46 in accordance with the "scheduled" control parameter values 52 can be considered as forming part of a variable geometry control module 64 of the variable geometry element controller 50 for ease of later reference. The variable geometry control module 64 can include tracking subroutines responsible for monitoring, via sensors integrated to one or more variable geometry element, the current geometrical configuration of the variable geometry element 46 and to confirm whether or not the variable geometry element 46 has indeed responded correctly to the control instructions 66.

As reflected in the example presented in FIG. 6, the control of the variable geometry elements 46 can involve the use of control data 48 which may be based on operating lines. The control data 48 can form a basis for matching information acquired about actual operating conditions (values of monitored parameters 54) with corresponding values control parameters 52 associated to corresponding geometrical configurations of the variable geometry element(s). This process of matching can be referred to as scheduling. The control data 48 can be designed in a manner to achieve the best compressor stage efficiency possible in a variety of operating conditions, while respecting safety margins with undesired aerodynamic behaviors such as surge or stall. The control data 48 can be provided by a team of compressor stage designers for instance.

In some cases, a measured value 56 can be used directly as a monitored value 54, whereas in other cases, one or more value of a measured parameter 56 can be used as the basis of determining a value of a synthetic parameter which is then used as a monitored value 54. A given measured value 56 can also be used both directly and as the basis of determining a synthetic value. The process or processes of forming one or more synthetic value based on one or more measured value can be considered to form part of a synthetic value determination module 62 of the variable geometry element controller 50 for ease of reference.

In some cases, a monitored parameter value 54 can be synthesized from one or more other measured parameter values 56, and potentially using one or more other synthesized parameter value, by calculation, i.e. using one or more equation as well as in some cases information about the engine which will collectively be referred to herein as characteristics data 68 for simplicity of reference. Characteristics data 68 can be provided by the designer for instance, and can be based on computer assisted simulation, test results, etc.

A somewhat simple example of a synthesized parameter value can be a synthesized pressure measurement value. Indeed, in a gas turbine engine, if pressure is measured at one point, together with other key measurements, relatively simple equations can lead to pressure at another point of the engine. For example, it can be feasible to either directly measure pressure before or after a compressor stage in an aircraft engine, and to determine the pressure of the other, provided other key measurements are also available. Using such principles, it can be relatively straightforward to synthesize pressure inside the combustion chamber using a measurement of pressure acquired immediately upstream of the combustion chamber and factoring in known pressure losses such as those which can be known to occur across the combustion chamber liner, for instance.

Depending on the embodiment, the engine controller 92 can be configured to switch from one variable element control schedule to another when switching into or out from disking mode. Indeed, depending on the application, it can be considered advantageous to set specific schedules for controlling one or more variable geometry elements when in disking mode, and switching from an idle mode to a disking mode, for instance, can include switching from an idle variable geometry schedule to a disking variable geometry schedule for instance, after which the variable geometry element(s) can be controlled as a function of the disking variable geometry schedule for the duration of the disking mode, for instance.

Figure 7A:
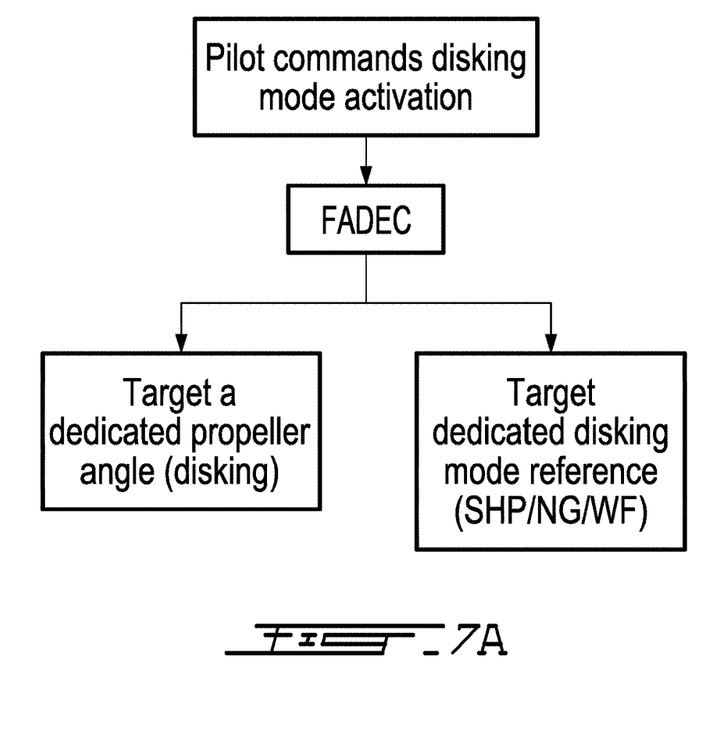
FIGS. 7A and 7B are flow charts representing disking mode activation and disking mode deactivation, respectively, in accordance with an embodiment.
Figure 7B:
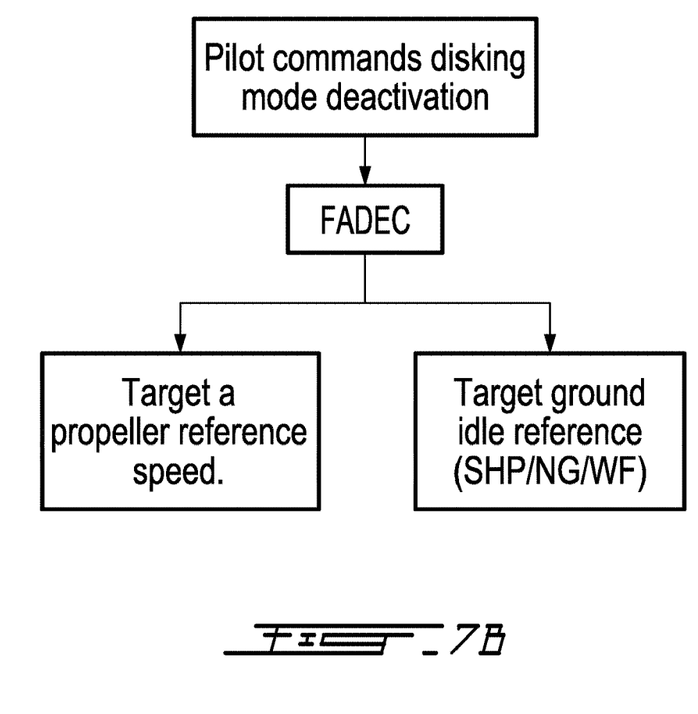

Similarly, one or more distinct "disking mode" schedule can be set for one or more other controllable engine parameters than variable geometry elements 46 or pitch. Indeed, in one embodiment, for example, presented in FIGS. 7A and 7B, a controllable engine parameter such as engine power, core speed, or fuel flow is controlled as a function of a target established by a disking mode reference/schedule when in disking mode, whereas the target is established by a ground idle reference/schedule when in ground idle mode. Such functions can be performed by a collection of functions referred to as an engine control module 99 for instance. The engine control module 99 can be a fuel control unit in an embodiment, for instance.

In some embodiments, the control scheme can even switch from one control scheme to another when switching into or out from the disking mode. For example, still referring to the example presented in FIGS. 7A and 7B, a blade control module can control the propeller based on a target defined in terms of propeller blade angle when in disking mode, and rather control the propeller based on a target defined in terms of propeller speed when in a ground idle mode. It will be understood that many more variations are possible.

In one example embodiment, when the pilot selects that mode referred as "disking mode", the software (FADEC) commands the propeller blade angle through the Propeller Control Unit (PCU) to a predetermined value which can be perfectly parallel to the plane of rotation or near parallel to the plane of rotation. The exact determination of the propeller blade angle is to be function of the preference of the airframer which respect to the desirable level and direction of the propeller wash. Simultaneously, the software also adjusts the power through the Fuel Control Unit (FCU) (which can form part of an engine control module for instance) to a minimum level possible, driven by basic operability limitation such as minimum core speed (NG), minimum fuel flow (WF), and or minimum power (SHP) for instance.

The activation of the disking on-ground mode could also include logics to ensure engine operation stability, including the transition phase from when the engine enters/exits that mode.

For instance, such disking on-ground stability logic could include, without being limited to, dedicated variable geometry schedules applying to IGV and VGV, as well as on customer bleed valve (turned on).

Various engine or propeller requirements can lead to define a targeted propeller speed zone which is desirable to attain when activating the disking mode. Two following optional functions could be independently added or not depending on the embodiment:

1. Using dedicated power schedule: once the disking mode activated, the software could rely on a dedicated requested power schedule based on various engine operating conditions (temperature, pressure and wind) in order to locate the resulting propeller speed into a safe targeted speed zone. For instance, if there is a dynamic mode at higher speed that needs to be avoided. In this case, the resulting power requested from the schedule is to be higher than the minimal power (min.+adder) in order to have the resulting propeller speed above the no dwell zone. The values of the requested power schedule could be determined based on simulation model or test data, or a combination of both. Also, notice that other constraints such as air system requirement could also be of consideration when defining the value of the dedicated power schedule.

2. Using speed sensor feedback: the engine power could also feature an automatic NP speed zone avoidance logic. When NP enters the no dwell zone with the lowest possible power/WF/NG schedule, power can be increased to push NP out of the zone. Could be done by increasing SHP in small steps or increasing SHP at slow rate until NP is out of the range. This could also be done by enabling a minimum NP limiter into the WF control loop when NP reaches the forbidden range for a sufficient amount of time, so that additional WF be commanded until NP exceed the minimum NP value.

The methods presented above can apply as well to aircraft application presenting more than one engine, for instance.

In still another embodiment, the engine can be operated for a limited amount of time into a sub-idle regime with the propeller angle set to a fine pitch such as the disking angle for instance, with only a primary manifold supplying the fuel to the combustion chamber and a secondary, or additional manifold, not supplying fuel to the combustion chamber. This could provide sufficient time to allow crew or mechanics to get in or access the aircraft without having to shut down the engine. Because of the highly non-uniform temperature distribution which can result from such an operating mode, a timer could be used to limit the engine sub-idle regime utilization period to avoid premature life deterioration of the component exposed to the hot gases exiting the combustion chamber.

Figure 8:
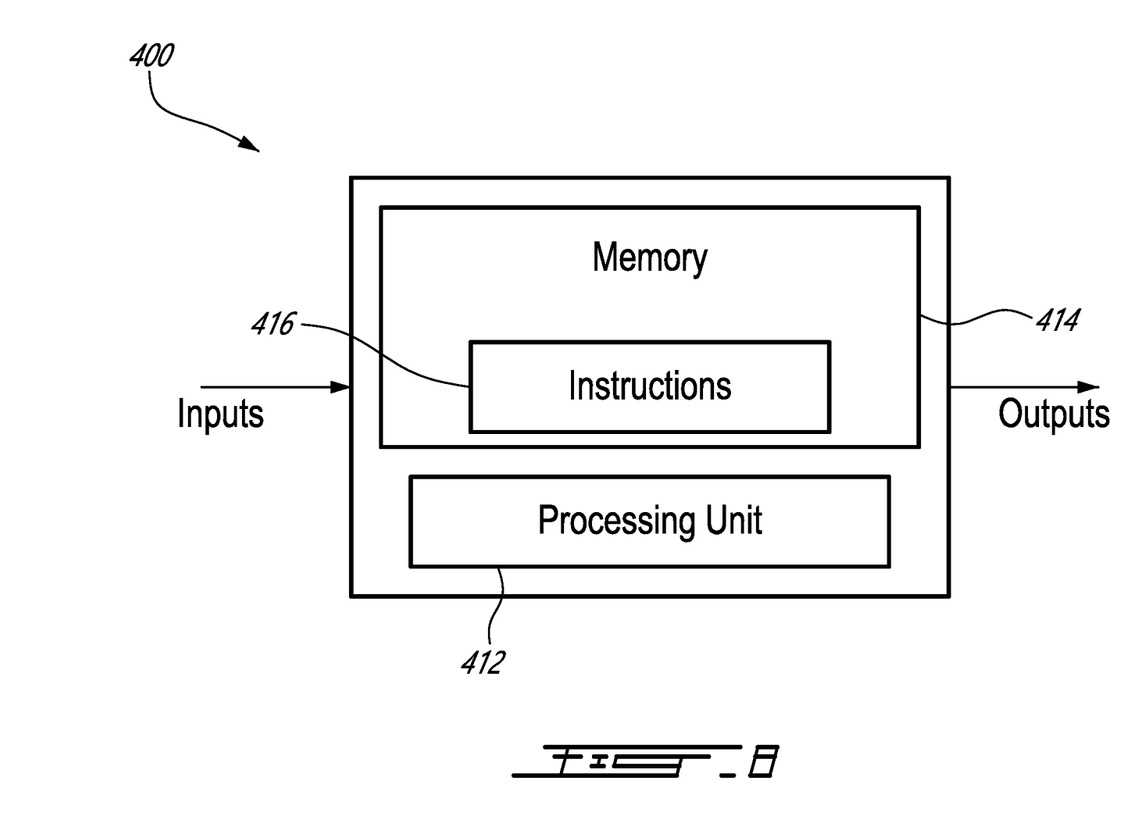
FIG. 8 is a block diagram of a computer.

Referring to FIG. 8, it will be understood that the expression "computer" 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions.

The embodiments described in this document provide non-limiting examples of possible implementations of the present technology. Upon review of the present disclosure, a person of ordinary skill in the art will recognize that changes may be made to the embodiments described herein without departing from the scope of the present technology. In particular, it will be understood that a disking angle/disking pitch is not necessarily defined with a high degree of precision. In some cases an average angle slightly off, e.g. within <5 degrees off the plane of rotation, may be satisfactory or even preferred for any suitable reason. It will be noted that while examples presented above used the example embodiments of a turboprop engine or of a turbofan engine, it will be understood that the disking mode can be applied to other types of airplane engines than pure heat engines, such as a hybrid heat/electric engine or pure electric engine, for instance. Yet further modifications could be implemented by a person of ordinary skill in the art in view of the present disclosure, which modifications would be within the scope of the present technology.

The invention claimed is:

1. A method of operating an engine of an airplane, the engine having an engine controller and a rotary thrust device having a plurality of variable pitch blades, each blade having a length extending radially away from a rotation axis, each blade individually rotatable around the length, the blades distributed circumferentially around the rotation axis and collectively rotatable around the rotation axis, in a plane of rotation, the method comprising:
while the airplane is on the ground:
at the engine controller, receiving an input indicative of a disking mode entry request, said input generated at a pilot interface when a requesting action is taken by the pilot, said requesting action being taken distinctly from a pilot action to control an engine power control;
at the engine controller, in response to said receiving input, entering a disking mode including positioning the blades at a disking pitch including rotating each blade around the length, the disking pitch oriented parallel to the plane of rotation;
at the engine controller, performing an automated function of maintaining the blades at the disking pitch using a stabilizing algorithm; and
at the engine controller, exiting the disking mode when a disking mode exit condition is met, including rotating each blade around the length, away from the disking pitch.

2. The method of claim 1 wherein said maintaining the blades at the disking pitch includes maintaining the blades at the disking pitch for at least one minute.

3. The method of claim 1 wherein said entering a disking mode includes lowering a gain of the engine controller.

4. The method of claim 1 wherein said entering the disking mode includes the engine controller switching from a first variable element control schedule to a second variable element control schedule, and wherein said exiting the disking mode includes the engine controller reverting from the second variable element control schedule back to the first variable element control schedule.

5. The method of claim 1 wherein said entering a disking mode includes switching from an idle mode to a disking mode, and includes rotating each blade between a fine pitch and the disking pitch.

6. The method of claim 5 further comprising, at a blade control module of the engine controller, maintaining a propeller speed at a reference propeller speed when in idle mode, and maintaining a blade pitch at the disking pitch when in disking mode.

7. The method of claim 5 further comprising, at the engine controller, controlling one or more controllable engine parameters to a disking mode reference value when in said disking mode, and controlling said one or more controllable engine parameters to an idle mode reference value when in said idle mode.

8. The method of claim 7 wherein the controllable engine parameter is one of engine power, core speed and fuel flow rate, and the disking mode reference value is expressed in terms of fuel flow rate.

9. The method of claim 5 wherein said switching from an idle mode to a disking mode includes switching from an idle power control schedule to a disking power control schedule, monitoring an engine power, and controlling the engine based on the monitored engine power based on the disking power control schedule while the blades are maintained at the disking pitch.

10. The method of claim 5 wherein said switching from an idle mode to a disking mode includes switching from an idle variable geometry schedule to a disking variable geometry schedule, monitoring at least one engine parameter, and controlling the engine based on the monitored at least one engine parameter and on the disking variable geometry schedule while the blades are maintained at the disking pitch.

11. The method of claim 5 wherein exiting disking mode includes switching back to the idle mode from the disking mode, and includes rotating each blade between the disking pitch and the fine pitch.

12. The method of claim 1 wherein said disking mode includes monitoring a rotation speed of the thrust device and controlling the engine in a manner to maintain the rotation speed of the thrust device outside of a placarded rotation speed zone based on the monitored rotation speed.

13. The method of claim 1, wherein, simultaneously to performing the automated function of maintaining the blades at the disking pitch using the stabilizing algorithm at the engine controller, the engine controller is configured to adjust engine power through a fuel control unit to a minimum level possible.

14. The method of claim 1 further comprising
while the airplane is on the ground:
at the engine controller, receiving an input indicative of a disking mode exit request, said input generated at the pilot interface when an additional requesting action is taken by a pilot, said additional requesting action being taken distinctly from the pilot action to control the engine power control, and
at the engine controller, receiving the input indicative of the disking mode exit request;
wherein said exiting the disking mode is in response to said receiving the input.

15. The method of claim 1, wherein entering the disking mode further includes entering the disking mode upon activation of a switch or a button by the pilot.

16. A system for operating an engine of an airplane, the engine having a rotary thrust device having a plurality of variable pitch blades, each blade having a length extending radially away from a rotation axis, each blade individually rotatable around the length, the blades distributed circumferentially around the rotation axis and collectively rotatable around the rotation axis, in a plane of rotation, the system comprising a non-transitory memory having stored thereon computer-readable instructions which, when executed thereon by a processor, perform a method including:
receiving an input indicative of a disking mode entry request, said input generated at a pilot interface when a requesting action is taken by the pilot, said requesting action being taken distinctly from a pilot action to control an engine power control;
in response to said receiving the input, entering a disking mode including positioning the blades at a disking pitch including rotating each blade around the length, the disking pitch oriented parallel to the plane of rotation;
performing an automated function of maintaining the blades at the disking pitch using a stabilizing algorithm; and
exiting the disking mode when a disking mode exit condition is met, including rotating each blade around the length, away from the disking pitch.

17. The system of claim 16, wherein said entering a disking mode includes switching from an idle mode to a disking mode, and includes rotating each blade between a fine pitch and the disking pitch, the system further comprising, at a blade control module, maintaining a propeller speed at a reference propeller speed when in idle mode, and maintaining a blade pitch at the disking pitch when in disking mode.

18. The system of claim 16, wherein said entering a disking mode includes switching from an idle mode to a disking mode, and includes rotating each blade between a fine pitch and the disking pitch, the system further comprising controlling one or more controllable engine parameter to a disking mode reference value when in said disking mode, and controlling said one or more controllable engine parameter to a idle mode reference value when in said idle mode.

19. A method of operating an engine of an airplane, the engine having an engine controller and a rotary thrust device having a plurality of variable pitch blades, each blade having a length extending radially away from a rotation axis, each blade individually rotatable around the length, the blades distributed circumferentially around the rotation axis and collectively rotatable around the rotation axis, in a plane of rotation, the method comprising:
while the airplane is on the ground:
at the engine controller, entering a disking mode including positioning the blades at a disking pitch including rotating each blade around the length, the disking pitch oriented parallel to the plane of rotation, said entering a disking mode further including lowering a gain of the engine controller;
at the engine controller, performing an automated function of maintaining the blades at the disking pitch using a stabilizing algorithm; and
at the engine controller, exiting the disking mode when a disking mode exit condition is met, including rotating each blade around the length, away from the disking pitch.

* * * * *